United States Patent
Baltes et al.

(10) Patent No.: US 11,268,541 B2
(45) Date of Patent: Mar. 8, 2022

(54) PRESSURE ACCUMULATOR HAVING A MONITORING DEVICE

(71) Applicant: HYDAC TECHNOLOGY GMBH, Sulzbach/Saar (DE)

(72) Inventors: Herbert Baltes, Losheim (DE); Peter Kloft, Ransbach-Baumbach (DE); Petra Jochum, Quierschied (DE); Daniel Rau, Saarbruecken (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 16/981,784

(22) PCT Filed: Mar. 11, 2019

(86) PCT No.: PCT/EP2019/055953
§ 371 (c)(1),
(2) Date: Sep. 17, 2020

(87) PCT Pub. No.: WO2019/179800
PCT Pub. Date: Sep. 26, 2019

(65) Prior Publication Data
US 2021/0115948 A1   Apr. 22, 2021

(30) Foreign Application Priority Data
Mar. 19, 2018   (DE) .................. 10 2018 002 315.0

(51) Int. Cl.
*F15B 1/10*   (2006.01)
*G01M 3/04*   (2006.01)

(52) U.S. Cl.
CPC ............. *F15B 1/103* (2013.01); *G01M 3/042* (2013.01); *F15B 2201/3153* (2013.01); *F15B 2201/405* (2013.01); *F15B 2201/50* (2013.01)

(58) Field of Classification Search
CPC ...... B65D 90/50; B65D 90/505; B65D 90/51; F15B 2201/405; F15B 2201/50;
(Continued)

(56) References Cited

U.S. PATENT DOCUMENTS

| 1,387,287 | A | * | 8/1921 | Margraf | ............... | G01N 31/222 |
| | | | | | | 73/29.02 |
| 2,844,026 | A | * | 7/1958 | Wischmeyer | ........ | G01N 31/222 |
| | | | | | | 73/61.43 |

(Continued)

FOREIGN PATENT DOCUMENTS

| DE | 10 2011 100 532 | 11/2012 |
| JP | 2011-215076 | 10/2011 |

(Continued)

OTHER PUBLICATIONS

International Search Report (ISR) dated May 29, 2019 in corresponding International Application No. PCT/EP2019/055953.

*Primary Examiner* — Robert K Arundale
*Assistant Examiner* — Richard K. Durden
(74) *Attorney, Agent, or Firm* — Wenderoth, Lind & Ponack, L.L.P.

(57) ABSTRACT

A pressure accumulator having an accumulator housing (10) in which a movable separating element (16) separates a gas chamber (12) filled with a working gas from a fluid chamber (14) in a fluid-sealed manner. A monitoring device (46) is provided, which, in the event of a fault impairing the sealing effect of the separating element (16), provides an optically discernible indication and has an inspection window (54), through which an indicator can be observed. The monitoring device is connected to the gas chamber (12) and changes optical properties discernibly when wetted with the fluid. The indicator changing its optical properties is accommodated in a capsule (48) with a capsule wall (50) permeable (Continued)

to the passage of the fluid and arranged between the inspection window (54) and the separating element (16) in the accumulator housing (10).

20 Claims, 2 Drawing Sheets

(58) Field of Classification Search
CPC ........ G01M 3/042; G01M 3/12; G01N 21/81; G01N 31/222
USPC .......................................................... 116/206
See application file for complete search history.

(56) References Cited

U.S. PATENT DOCUMENTS

| | | | | |
|---|---|---|---|---|
| 2,918,893 | A * | 12/1959 | Norton | G01M 3/12 |
| | | | | 116/206 |
| 2,934,954 | A * | 5/1960 | Phillips | G01N 31/222 |
| | | | | 374/142 |
| 3,000,345 | A * | 9/1961 | Gray, Jr. | G01P 13/008 |
| | | | | 116/206 |
| 3,067,015 | A * | 12/1962 | Lawdermilt | 422/407 |
| 3,100,691 | A * | 8/1963 | Jones | G01N 31/222 |
| | | | | 422/402 |
| 3,142,287 | A * | 7/1964 | Jones | G01N 31/222 |
| | | | | 116/206 |
| 3,502,436 | A | 3/1970 | Hoover et al. | |
| 4,063,452 | A * | 12/1977 | Bradshaw | A01G 27/008 |
| | | | | 73/73 |
| 4,201,080 | A | 5/1980 | Slepak et al. | |
| 4,793,180 | A * | 12/1988 | Stewart | G01N 21/81 |
| | | | | 116/200 |
| 5,383,338 | A * | 1/1995 | Bowsky | F25B 41/006 |
| | | | | 116/206 |
| 6,576,473 | B1 * | 6/2003 | Scaringe | G01N 21/80 |
| | | | | 422/401 |
| 2003/0096107 | A1 * | 5/2003 | Birkholz | G09F 3/0291 |
| | | | | 428/343 |
| 2003/0198573 | A1 * | 10/2003 | Forood | G01N 21/6428 |
| | | | | 422/82.08 |
| 2013/0180899 | A1 * | 7/2013 | Koch | B01D 35/143 |
| | | | | 210/85 |
| 2015/0345802 | A1 | 12/2015 | Van Haaren et al. | |
| 2016/0258449 | A1 | 9/2016 | Lehnert | |
| 2018/0195740 | A1 | 7/2018 | Van Haaren et al. | |
| 2018/0245656 | A1 * | 8/2018 | Baltes | F16F 9/006 |

FOREIGN PATENT DOCUMENTS

| | | |
|---|---|---|
| WO | 2015/113731 | 8/2015 |
| WO | 2015/183933 | 12/2015 |

\* cited by examiner ically discernible indication and which has an inspection window, through which an indicator can be observed. The monitoring device is connected to the gas chamber and has optical properties that change discernibly when wetted with the fluid.

PRESSURE ACCUMULATOR HAVING A MONITORING DEVICE

FIELD OF THE INVENTION

The invention relates to a pressure accumulator having an accumulator housing, in which a movable separating element separates a gas chamber filled with a working gas from a fluid chamber in a fluid-sealed manner. A monitoring device is provided, which, in the event of a fault impairing the sealing effect of the separating element, provides an optically discernible indication and which has an inspection window, through which an indicator can be observed. The monitoring device is connected to the gas chamber and has optical properties that change discernibly when wetted with the fluid.

BACKGROUND OF THE INVENTION

Such a pressure accumulator is known from WO 2015/113731 A1, for instance. The monitoring device permits the functionality of the pressure accumulator to be checked, while the system is in operation without the pressure accumulator having to be removed from the system and be subjected to an external functional test. Advantageously, a sample quantity of special glass fiber wool is used as an indicator, which is white in the non-wetted state and visibly discernible changes color when wetted with fluids of different kinds. The glass fiber wool is arranged in a drilled hole leading through the wall of the housing to the gas chamber between a threaded insert containing the inspection window and a screen body at the inner end of the drilled hole. With regard to the good discernibility of the indicator after an indication of a fault, a simplified handling and a space-saving structure, the known solution still leaves a lot to be desired.

SUMMARY OF THE INVENTION

The invention addresses the object of simplifying the discernibility and handling of an indicator as part of a monitoring device and permitting a space-saving structure.

A pressure accumulator entirety solving this object is characterized in that the indicator changing its optical properties is accommodated in a capsule. The capsule wall of the capsule is permeable to the passage of the fluid and is arranged in the accumulator housing between the inspection window and the separating element.

Accommodating the indicator inside a capsule creates a compact component, which can be stored and transported in a simple and space-saving manner. The capsule in the monitoring system can be installed, removed and optionally replaced in just a few steps. The capsule is arranged loosely or stationary in relation to the accumulator housing between the inspection window and the separating element. In this way, a space-saving structure of the entire monitoring device is permitted, as the capsule having the indicator accommodated therein has a low overall height. Advantageously, the capsule has a flat basic shape having the largest possible capsule wall for the passage of the fluid to be detected. Appropriately, the capsule has a circular basic shape for the arrangement in a drilled hole in the accumulator housing. Practical tests have shown that the capsule structure also improves the discernibility of the indicator compared to the known solution using glass wool.

In a preferred embodiment of the pressure accumulator according to the invention, the capsule has a pad (cushion) in its interior, which accommodates the indicator and which is accommodated between at least one fluid-permeable protective layer. The at least one protective layer effectively prevents the pad from being possibly damaged by contact with the inner wall of the capsule. The capsule encompasses the pad, which is preferably made of a fleece, advantageously almost without any gap. In this respect, the protective layer also protects the pad from being unintentionally removed from the capsule.

In another preferred embodiment of the pressure accumulator according to the invention, the capsule has a circumferential trough rim protruding in the direction of the inspection window for the purpose of holding the indicator dissolved and/or dispersed in the fluid, which emerges from passages in the upper capsule shell of the capsule. Passages in the lower capsule shell permit the fluid to pass into the capsule having the pad. The fluid flowing into the monitoring device having the capsule arranged therein reaches the pad after passing through the lower capsule shell and the receptacle trough adjoining thereto after passing through the upper capsule shell, which permits a functionally reliable operation.

As soon as a fault is detected based on a reaction with the indicator, the fluid emerging at the upper capsule shell has the color matching the optical properties of the indicator, which change when wetted with the fluid. A signal color that has a high luminosity and is easily discernible by an operator through the inspection window is advantageous here. It should be noted that the interior of the accumulator housing is unlit, which is why the capsule with the indicator accommodated therein is preferably positioned close to the inspection window. Then, light from outside can be used to observe a signal in case of a fault.

In a preferred embodiment of the pressure accumulator according to the invention, the trough rim of the capsule is formed by a lateral rim of the lower capsule shell, which projects axially beyond the upper capsule shell to form a receptacle trough. The trough rim protruding in the direction of the inspection window permits supporting a transparent cover. The cover on the one hand closes off the trough as a chamber for the fluid emerging at the upper capsule shell of the capsule and on the other hand permits an observation of the fluid. It is also conceivable to position the inspection window directly adjoining to the trough rim of the capsule. The lower capsule shell, which protrudes axially beyond the upper capsule shell, encompasses the upper capsule shell in the manner of a clamp along the entire outer rim and preferably is also used to ensure a reliable contact between the two capsule shells. The cover in conjunction with the trough prevent the indicator substance from unintentionally evaporating from the monitoring device.

Another advantage is that the receptacle trough is spanned by a lid part which, when kept transparent, permits a view from the inspection window at least of the contents of the trough. The fluid coming from the indicator and flowing from the capsule into the trough can be monitored through the lid part. A change of its optical properties, such as a change in color, while creating a signal color can be recognized as a signal for a fault.

Particularly preferably, the lid part has optical properties, such as prismatic properties, a coating or a magnification. The optical properties of the lid part are chosen to meet the requirements in order to facilitate an observation of the content of the trough through the lid part. In addition to a magnification, the enhancement of contrasts for detection of a change in the optical properties of the fluid is advantageous, to which a coating also contributes.

In a preferred embodiment of the pressure accumulator according to the invention, the inspection window is formed by a gauge glass, which is inserted into a cover-sided closure part of the accumulator housing and permits an outside view of the capsule as the central component of the monitoring device. Appropriately, the gauge glass is located at the outer end of a drilled hole in the accumulator housing or end part, particularly preferably screwed or glued to an inner thread of the drilled hole.

In a further preferred embodiment of the pressure accumulator according to the invention, the lid part and the capsule having the indicator pad are held by a screen body. The screen body can be inserted into the cover-shaped end part of the accumulator housing from the side of the separating element and in particular is held in position by a screw insert. In this way, the individual components of the monitoring device can be easily and compactly inserted in a space, such as the inside of a hole drilled in the end part. Particularly preferably, the screw insert for fixation of the position of the screen body is arranged at the lower end of the drilled hole. Advantageously, the components are formed and arranged rotationally symmetrically to the axis of symmetry of the drilled hole. The inspection window, the lid part, the capsule having the indicator and the screen body are arranged in succession from the outside to the inside along the axial extension of the drilled hole. The screen body permits the fluid passage of the medium to be detected into the capsule having the indicator pad. A fluid-permeable membrane part can also be used instead of the screen body.

In a further preferred embodiment of the invention, the indicator, when in contact with the fluid, starting from a neutral color, causes a visible color change under formation of a signal color. The indicator is selected from the group of substances of the (diethylamino)benzo[a]phenoxazines. By the color change from the neutral color to the signal color, which contrasts significantly in color from the neutral color, a warning signal for a fault detected by the monitoring device is generated. For instance, a color change from white to red, green or blue may occur. Because the color change is towards a conspicuous color having a signal effect, the fault indicated by the chemical indicator can hardly be overlooked by an operator. Particularly preferably, the molecular formula of the chemical indicator is $C_{20}H_{18}N_2O_2$. This reagent, which also bears the chemical name "Nile Red", generates the signal color red, which cannot be overlooked, when reacting with the assigned medium to be detected.

Further, it is advantageous if the pad for the indicator is a fleece, preferably a glass fiber fleece, or a glass fiber fabric, in particular a glass silk fabric. A fleece (non-woven) or a cotton wool usually has the neutral color white, so that when using a chemical indicator such as "Nile Red" or the like, a clearly visible color change under formation of the signal color red is guaranteed. Furthermore, a pad can be easily manufactured from a fleece or glass fiber fabric in a particularly cost-effective way.

The invention further relates to a monitoring device for detecting an undesired fluid and for optically indicating the occurrence of this fluid as a fault. The monitoring device has an indicator, which can be wetted with the fluid and which has the optical properties that discernibly change when wetted with the fluid. An inspection window is provided through which the indicator can be observed. A monitoring device according to the invention is characterized in that the indicator changing its optical properties is accommodated in a capsule. The capsule wall of which is the capsule to the passage of the fluid and is arranged in a position permitting the observation through the inspection window. The monitoring device is preferably used in a pressure accumulator having an accumulator housing, in which a movable separating element separates a gas chamber filled with a working gas from a fluid chamber in a fluid-sealed manner and is used to monitor the sealing effect of the separating element. The field of application of the monitoring device according to the invention is not limited. It can be arranged at a wide variety of installation locations on a component for the detection of a fluid accommodated or conveyed in the component. The invention also concerns a preferably exchangeable capsule, in particular for such a monitoring device.

The above-mentioned features and the further disclosed features can be implemented in accordance with the invention each individually or in any combinations at a pressure accumulator according to the invention or at a monitoring device according to the invention, together with the capsule.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
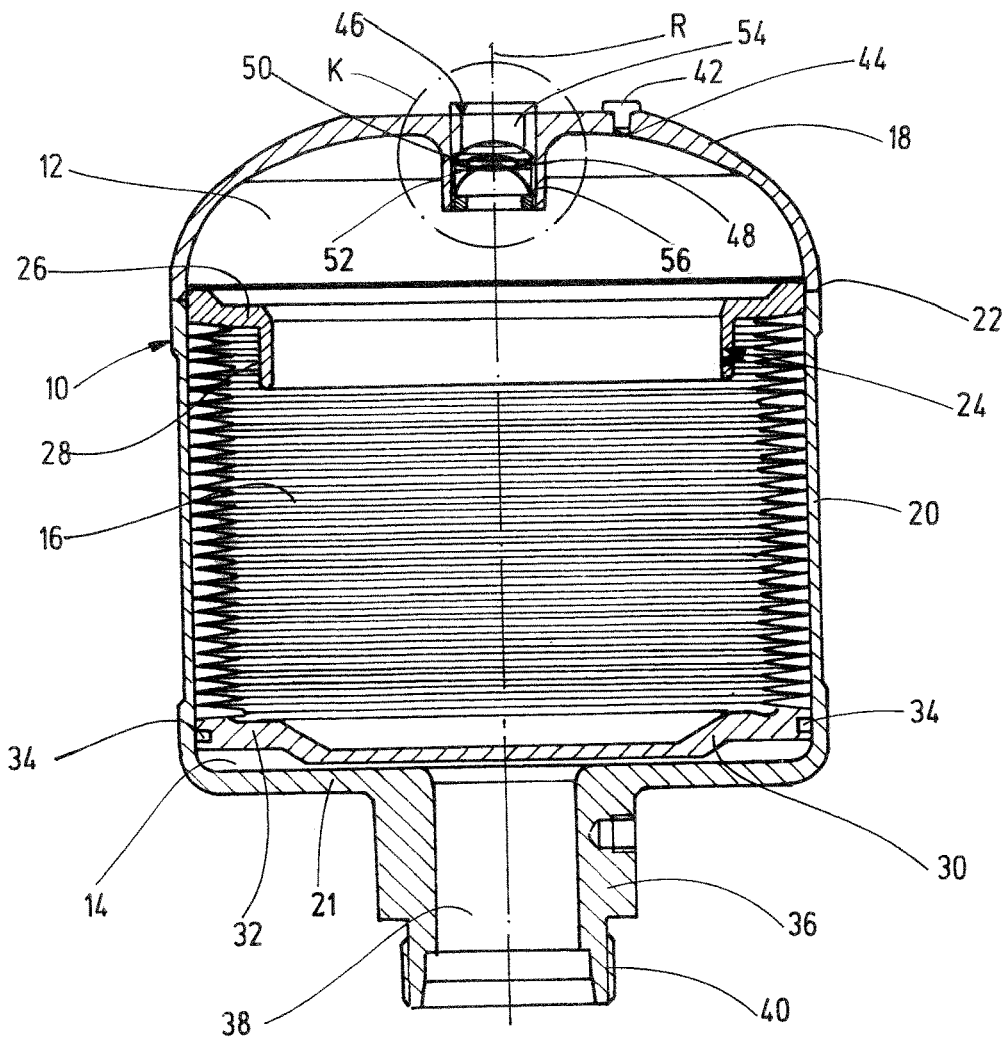
FIG. 1 is a side view in section of a pressure accumulator according to an exemplary embodiment of the invention.

FIG. 1 shows a sectional view of a pressure accumulator having an accumulator housing 10 having a gas chamber or room 12 filled with a working gas and a fluid chamber or room 14, which are separated from each other in a fluid-sealed manner by a movable separating element 16. The accumulator housing 10 of the pressure accumulator, which is rotationally symmetrical to an axis of rotation R, comprises a cover-sided closing part 18 and a tubular cylindrical main part 20 having a bottom 21. The closing part 18 and the main part 20 are welded together on a circumferential, narrow mounting surface 22. The gas chamber 12 is located in the part, assigned to the closing part 18, of the accumulator housing 10. An annular insert part 24 having a horizontal first section 26 and a vertical second section 28 directed towards the fluid chamber 14 is provided in the area of the connection of the closing part 18 to the main part 20.

The rotation axis R of the pressure accumulator determines the vertical direction. The first section 26 forms an upper attachment point for the separating element 16, which is formed as a bellows. The lower end of the separating element 16 is attached to a plate part 30, which is movably arranged inside the pressure accumulator and has a circular cross-section corresponding to the inner cross-section of the accumulator housing 10. In the unused state of the accumulator shown in FIG. 1, the maximum extension of the separator element 16 is in the axial direction and the plate part 30 is located close to the bottom 21 of the accumulator housing 10. A rim section 32 of the plate part 30 has a slightly greater thickness than the main part in the center. At the rim section 32 several guides 34 are formed, which are directed towards the inner wall of the accumulator housing 10 and facilitate an axial movement of the plate section 30 in the pressure accumulator without obstacles.

To the bottom 21 of the accumulator housing 10, an extension-shaped connecting element 36 adjoins, in which a fluid port 38 is formed and opens into the fluid chamber 14. To close the fluid port 38 using a screw cap, not shown in FIG. 1, an outer thread 40 is formed at the lower end of the connecting element 36. The outer thread 40 is otherwise used to connect a fluid line (not shown), to which the bellows accumulator can be connected. In the cover side closing part 18 of the accumulator housing 10, a filling port 44 for filling the gas chamber 12 is formed offset laterally to the axis of rotation R and closed in a gas-sealed manner by a fitting 42.

The central component of the pressure accumulator is a monitoring device 46, which is inserted into an extension of the cover-sided closing part 18 protruding into the interior of the accumulator housing 10, in a manner that is rotationally symmetrical to the axis of symmetry R. The monitoring device 46 provides an optically recognizable indication in the event of a malfunction impairing the sealing effect of the separating element 16. In the event of the malfunction, fluid passes from the fluid chamber 14 into the gas chamber 12. For this purpose, the monitoring device 46 has an indicator accommodated in a capsule 48. The indicator recognizably changes its optical properties when wetted with the fluid undesirable in the gas chamber 12. A capsule wall 50 is formed to be permeable for the passage of the fluid.

To observe the indicator and a change of its optical properties, an inspection window 54 is arranged at the outside end of the monitoring device 46, which is arranged in a through bore 52 in the closing part 18. The inspection window 54 is preferably formed by a shatterproof gauge glass and provides a view of the capsule 48 from the outside. For position fixation of the capsule 48, a screen body 56 is arranged at the inner end of the monitoring device 46, assigned to the separating element 16. The screen body 56 is inserted from the side of the separating element 16 into the cover-shaped closing part 18 and held there in position by a screw insert 58. The capsule 48 having the indicator changing its optical properties is arranged between the inspection window 54 and the separating element 16 in the accumulator housing 10 and is held in its position by the screen body 56.

Figure 2:
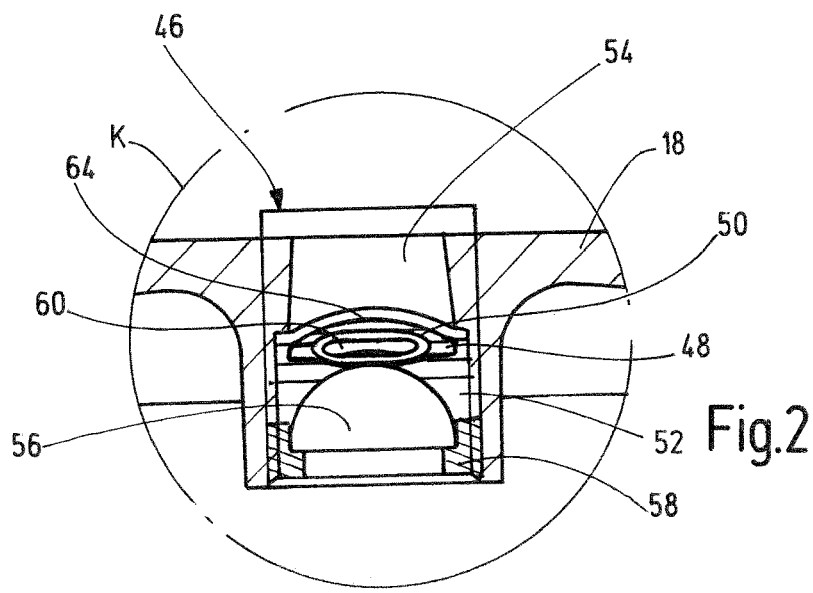
FIG. 2 is an enlarged side view in section of the monitoring device arranged in the pressure accumulator of FIG. 1.

FIG. 2 shows an enlarged view, corresponding to the circular section K, of the monitoring device 46 of FIG. 1 having the inspection window 54, the capsule 48 and the screen body 56 including the screw insert 58. FIG. 2 illustrates that the capsule 48 accommodates a flat pad 60 (cushion) in its inside, which in turn accommodates the indicator and is a fleece, preferably a glass fiber fleece, or a glass fabric, in particular a glass silk fabric. The indicator is a reagent accommodated in the pad 60. The reagent changes its optical properties on contact with the fluid, preferably starting from a neutral color to a visible color change, under creation of a signal color. Preferably, the indicator is selected from the group of substances of (diethylamino)benzo[a] phenoxazines, which cause the color to change to the signal color red. To permit a contact of the pad 60 and a reaction of the indicator with the fluid to be detected, the capsule wall 50 is provided with passages 80, 82 (see FIG. 3) for the passage of the fluid.

A receptacle trough 62 for the fluid emerging at the top of the pad 60 is formed above the capsule 48. The receptacle trough 62 is spanned by an upwardly curved lid part 64, which, when kept transparent, permits a view from the inspection window 54 at least of the contents of the trough. The lid part 64 has optical properties, such as prismatic properties, a coating or a magnification. This lid part permits in a simple and reliable way an observation of an optically changed, preferably discolored fluid at the top of the capsule 58, which indicates a failure due to a defect at the separator element 16. The color change towards a signal color can be clearly observed through the inspection window 54, even in daylight. The monitoring device 46 permits a non-destructive, tool-free visual inspection of the separator element 16 located in the accumulator housing 10 during operation and maintenance. In particular, the trough formation of the capsule 48 in its upper area significantly increases the indicator area, which results in improved discernibility of the color change compared to known solutions.

Figure 3:
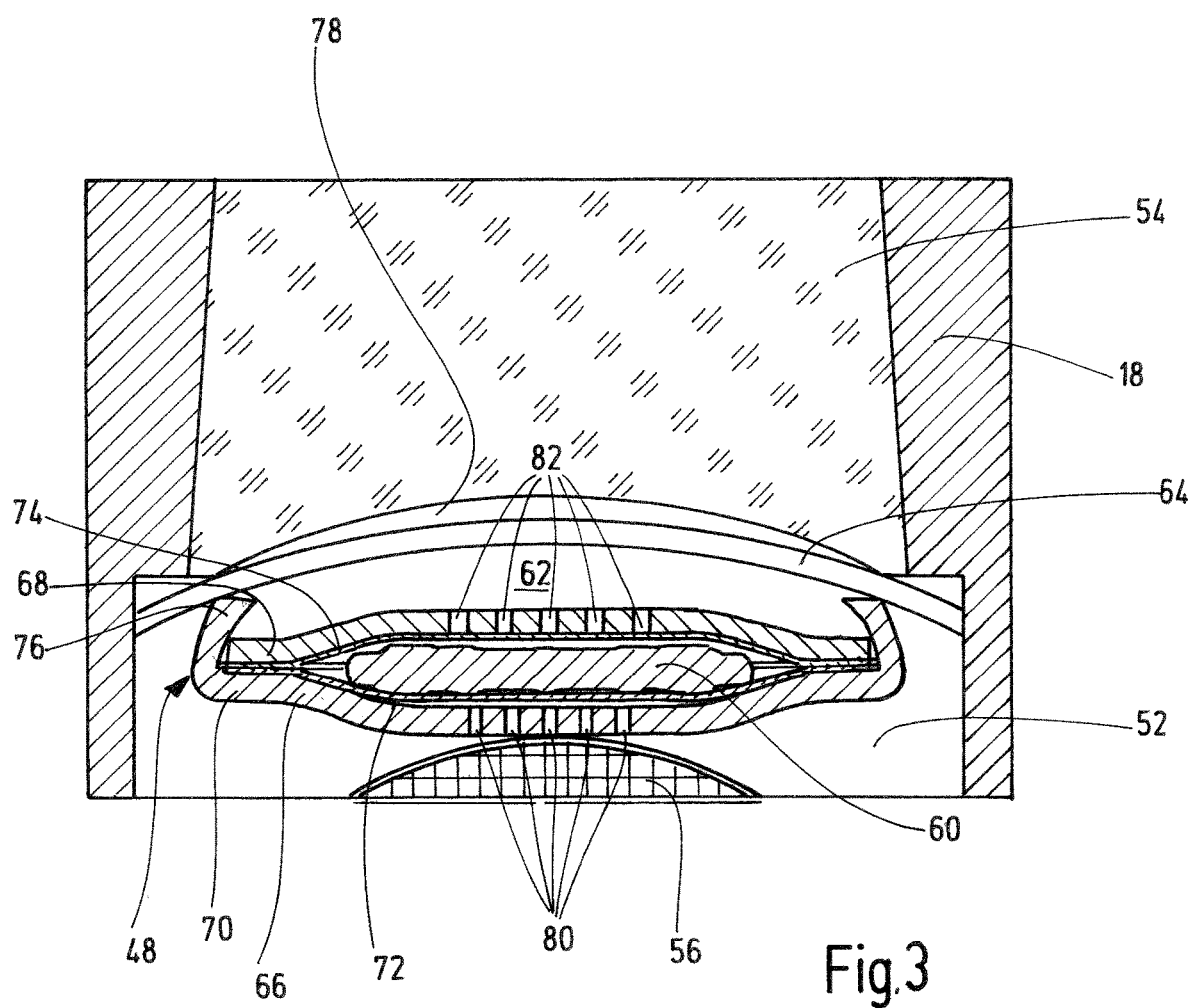
FIG. 3 is an enlarged side view in section of an exemplary monitoring device according to the invention illustrating the construction of the capsule with the indicator pad accommodated therein.

FIG. 3 shows the formation of the capsule 48 in detail, in particular as part of the monitoring device 46 according to the invention, which is held stationary by the screen body 56, for instance in the through hole 52 of an closing part 18 or a different component. The capsule 48 has a lower capsule shell 66 and an upper capsule shell 68, which are arranged in parallel to each other in the central main part of the capsule 48, which enclose the pad 60 and which are in contact with each other in the rim area 70. In the rim area 70, the two capsule shells 66, 68 fix between them a lower fluid permeable protective layer 72 and an upper fluid permeable protective layer 74. The pad 60 is located between the two fluid-permeable protective layers 72, 74. The lower capsule shell 66 is widened compared to the upper capsule shell 68, and its lateral rim is bent upwards. In this way the lower capsule shell 66 protrudes over the upper capsule shell 68, forming the receptacle trough 62. The lateral rim of the lower capsule shell 68 forms a trough rim 76, which is used as a support for the lid part 64 to span the receptacle trough 62. The inspection window 54 adjoins to the lid part 64, leaving a narrow gap 78 between the lid part 64 and the inspection window 54. It is also conceivable to arrange the inspection window 54 such that it lies flat against the lid part 64, thereby omitting the gap 78. It is also conceivable to integrate the optical properties provided by the lid part 64 into the inspection window 54, for instance by providing a coating on the lower side assigned to the capsule 48 and placing the inspection window 54 directly on the trough rim 76.

A number of passages 80 and 82 is formed in the two capsule shells 66, 68, which each permit the fluid to pass through with or without indicator. In the event of a fault, the fluid coming from a gas chamber 12 (see FIG. 1), for instance, reaches the capsule 48 through the screen body 56. The fluid reaches the pad 60 having the indicator contained therein through the passages 80 in the lower capsule shell 66 and the lower fluid-permeable protective layer 72. Because of a reaction with the indicator, the fluid changes its optical properties and advantageously adopts a signal color, such as red. Starting from the pad 60, upon further spread the fluid reaches the receptacle trough 62 through the upper fluid-permeable protective layer 74 and the other passages 82 in the upper capsule shell 68. The discolored fluid as the content of the trough is clearly discernible to an observer through the transparent inspection window 54 and the transparent lid part 64 as a signal for a fault.

The solution according to the invention is not limited to the use of bellows accumulators, but can be used for all types of pressure accumulators, such as piston, bladder and diaphragm accumulators for instance, in which a movable separating element separates a gas working chamber from a fluid chamber.

While one embodiment has been chosen to illustrate the invention, it will be understood by those skilled in the art that various changes and modifications can be made therein without departing from the scope of the invention as defined in the claims.

The invention claimed is:

1. A pressure accumulator, comprising:
   an accumulator housing having a gas chamber fillable with a working gas and a liquid chamber inside thereof;
   a movable separating element separating the gas chamber and the liquid chamber by a seal;
   a monitoring device being connected in fluid communication to the gas chamber, having an indicator providing an optically discernible indication upon a fault in the seal of the separating element and having an inspection window through which the indicator can be observed, the indicator having optical properties that change discernibly when the indicator is wetted with a liquid from the liquid chamber;
   a capsule having the indicator accommodated in an interior thereof, the capsule having a permeable capsule wall allowing passage of the liquid from the liquid chamber through the capsule wall and being located between the inspection window and the separating element in the accumulator housing; and
   a circumferential trough rim protruding from the capsule in a direction of the inspection window and holding a portion of the indicator that may become dissolved or disbursed in the liquid that emerges from upper passages in an upper capsule shell of the capsule wall, lower passages in a lower capsule shell of the capsule wall permitting the liquid to pass into the capsule.

2. A pressure accumulator according to claim 1 wherein the interior of the capsule has a pad located between liquid-permeable protective layers, the pad configured to accommodate the indicator.

3. A pressure accumulator according to claim 2 wherein the pad is a fleece.

4. A pressure accumulator according to claim 2 wherein the pad is at least one of a glass fiber fleece or a glass fiber fabric.

5. A pressure accumulator according to claim 2 wherein the pad is a glass silk fabric.

6. A pressure accumulator according to claim 1 wherein the circumferential trough rim is a lateral rim of the lower capsule shell and projects axially beyond the upper capsule shell forming a receptacle trough.

7. A pressure accumulator according to claim 6 wherein the receptacle trough is spanned by a transparent lid part permitting viewing of contents in the receptacle trough from the inspection window.

8. A pressure accumulator according to claim 7 wherein the lid part has at least one of a prismatic property, a magnification property, or a coating.

9. A pressure accumulator according to claim 7 wherein the lid part and the capsule are held by a screen body inserted in a cover end part of the accumulator housing from a side facing the separating element.

10. A pressure accumulator according to claim 9 wherein the screen body is held in position in the cover end part by a screw insert.

11. A pressure accumulator according to claim 1 wherein the inspection window is formed of a gauge glass inserted into a cover-side closure part of the accumulator housing and permits viewing of the capsule from outside of the accumulator housing.

12. A pressure accumulator according to claim 1 wherein
   the indicator changes from a neutral color to a signal color when contacted by the liquid and is a (diethylamino) benzo[a]phenoxazine.

13. A monitoring device for detecting an undesired liquid in a device chamber and for providing an optically discernible indication of a detection of the liquid in the device chamber as a fault, the monitoring device comprising:
   an indicator providing the optically discernible indication of the fault upon being wetted by the liquid by a change in an optical property of the indicator;
   an inspection window allowing observation of the indicator through the inspection window;
   a capsule having an interior in which the indicator is accommodated, the capsule having a capsule wall permeable to passage of the liquid therethrough and being in a position observable through the inspection window;
   a circumferential trough rim protruding from the capsule in a direction of the inspection window and holding a portion of the indicator that may become dissolved or disbursed in the liquid emerging from upper passages in an upper capsule shell of the capsule wall, lower passages in a lower capsule shell of the capsule permitting the liquid to pass into the capsule.

14. A monitoring device according to claim 13 wherein the interior of the capsule has a pad configured to accommodate the indicator.

15. A monitoring device according to claim 14 wherein the pad is accommodated between liquid-permeable protective layers.

16. A monitoring device according to claim 14 wherein the pad is a fleece.

17. A monitoring device according to claim 13 wherein the circumferential trough rim is a lateral rim of the lower capsule shell and projects axially beyond the upper capsule shell forming a receptacle trough.

18. A monitoring device according to claim 17 wherein the receptacle trough is spanned by a transparent lid part permitting viewing of contents in the receptacle trough from the inspection window.

19. A monitoring device according to claim 18 wherein the lid part has at least one of a prismatic property, a magnification property, or a coating.

20. A monitoring device according to claim 13 wherein
   the indicator changes from a neutral color to a signal color when contacted by the liquid and is a (diethylamino) benzo[a]phenoxazine.

* * * * *